United States Patent
Tanaka et al.

(10) Patent No.: US 9,599,411 B2
(45) Date of Patent: Mar. 21, 2017

(54) DOUBLE-JET TYPE FILM COOLING STRUCTURE

(75) Inventors: Ryozo Tanaka, Kakogawa (JP); Masahide Kazari, Akashi (JP); Takao Sugimoto, Kobe (JP); Karsten Kusterer, Plombieres (BE); Dieter Bohn, Moers (DE); Anas Elyas, Aachen (DE)

(73) Assignees: Kawasaki Jukogyo Kabushiki Kaisha, Kobe-shi (JP); B&B AGEMA GmbH, Aachen (DE)

( * ) Notice: Subject to any disclaimer, the term of this patent is extended or adjusted under 35 U.S.C. 154(b) by 980 days.

(21) Appl. No.: 13/636,667

(22) PCT Filed: Mar. 2, 2011

(86) PCT No.: PCT/JP2011/001207
§ 371 (c)(1),
(2), (4) Date: Mar. 28, 2013

(87) PCT Pub. No.: WO2011/118131
PCT Pub. Date: Sep. 29, 2011

(65) Prior Publication Data
US 2013/0175015 A1 Jul. 11, 2013

(30) Foreign Application Priority Data
Mar. 24, 2010 (JP) ................................. 2010-067329

(51) Int. Cl.
*F01D 5/14* (2006.01)
*F01D 5/18* (2006.01)
(Continued)

(52) U.S. Cl.
CPC ............... *F28F 3/12* (2013.01); *F01D 5/186* (2013.01); *F23R 3/06* (2013.01); *F05D 2250/14* (2013.01);
(Continued)

(58) Field of Classification Search
CPC .................................. F28F 3/12; F01D 5/186
(Continued)

(56) References Cited

U.S. PATENT DOCUMENTS 4,529,358 A 7/1985 Papell
5,419,681 A 5/1995 Lee
(Continued)

FOREIGN PATENT DOCUMENTS

CH 702107 A2 4/2011
DE 102010037050 A1 5/2011
(Continued)

OTHER PUBLICATIONS

ISA Japan, International Search Report of PCT/JP2011/001207, Apr. 12, 2011, WIPO, 2 pages.
(Continued)

*Primary Examiner* — Audrey K Bradley
*Assistant Examiner* — Anthony Ayala Delgado
(74) *Attorney, Agent, or Firm* — Alleman Hall McCoy Russell & Tuttle LLP (57) ABSTRACT

Provided is a film cooling structure capable of suppressing a cooling medium film from being separated from a wall surface, to increase a film efficiency on the wall surface and thereby-cool the wall surface effectively. One or more pairs of injection holes are formed on a wall surface facing a passage of high-temperature gas to inject a cooling medium to the passage. A single supply passage is formed inside the wall to supply the cooling medium to the injection holes. A separating section is provided between the injection holes in a location forward relative to rear ends of the injection holes to separate the cooling medium into components flowing to the injection holes. An injection direction of the cooling medium is inclined relative to a gas flow direction so that the cooling medium forms swirl flows that push the cooling medium against the wall surface.

8 Claims, 10 Drawing Sheets

(51) Int. Cl.
    *F28F 3/12*     (2006.01)
    *F23R 3/06*     (2006.01)

(52) U.S. Cl.
    CPC .... *F05D 2250/72* (2013.01); *F05D 2260/202* (2013.01)

(58) Field of Classification Search
    USPC .............................. 165/168; 416/96 R, 97 A
    See application file for complete search history.

(56) References Cited

U.S. PATENT DOCUMENTS

| | | |
|---|---|---|
| 6,092,982 A | 7/2000 | Ikeda et al. |
| 2005/0286998 A1* | 12/2005 | Lee ..................... B23K 26/383 415/117 |

FOREIGN PATENT DOCUMENTS

| | | |
|---|---|---|
| EP | 2390465 A2 | 11/2011 |
| JP | 60216022 A | 10/1985 |
| JP | 10089005 | 4/1998 |
| JP | 2006009785 | 1/2006 |
| JP | 2008008288 | 1/2008 |
| JP | 2008248733 | 10/2008 |
| WO | 2007052337 A1 | 5/2007 |

OTHER PUBLICATIONS

European Patent Office, Extended European Search Report of EP11758943.2, Germany, Aug. 6, 2013, 3 pages.

* cited by examiner

DOUBLE-JET TYPE FILM COOLING STRUCTURE

TECHNICAL FIELD

The present invention relates to a film cooling structure in which injection holes are provided on a wall surface facing a high-temperature gas passage, such as a rotor blade, a stator vane, and an inner tube of a combustor, in a gas turbine engine, and cooling of the wall surface is performed by flowing a cooling medium injected from the injection holes along the wall surface.

BACKGROUND ART

Conventionally, many injection holes are provided on a wall surface such as a rotor blade in a gas turbine engine (hereinafter simply referred to as "gas turbine") such that they are oriented in the same direction. A film flow of a cooling medium such as air injected from these injection holes cools the wall surface exposed to high-temperature gas. As such a film cooling structure, for example, it is proposed that a rib having a substantially isosceles triangle shape in a plan view, having a base at a rear end of each of the injections holes and a vertex positioned at an upstream side (front side), is provided at a center portion of an injection port through which the cooling medium is injected to the wall surface, and is configured to disperse the cooling medium to the right and to the left, thereby cooling the wall surface uniformly (Patent Literature 1).

CITATION LISTS

Patent Literature

Patent Literature 1: Japanese Laid-Open Patent Application Publication No. 2008-248733

SUMMARY OF THE INVENTION

Technical Problem

In the above stated cooling structure, the rib extends to the rear end of the injection hole and the both side surfaces of the rib extending in a flow direction of the cooling medium have inclined surfaces inclined toward the center of cooling medium flows from inward of the wall surface to the wall surface. Therefore, the rib cannot separate the cooling medium flows from each other sufficiently. That is, the cooling medium is separated by the rib into a pair of rightward and leftward flows. At this time, a part of the cooling medium is guided, along the inclined side surfaces of the rib, toward a center axis between the pair of cooling medium flows from a front end to a rear end of the rib, i.e., over a wide region to the rear end of the injection hole. Thereby, a part of the cooling medium is injected in an obliquely rearward direction from the rear end of the injection hole toward the center, which causes the cooling medium flows to be separated insufficiently. In this case, a part of the cooling medium flows into a low-pressure portion between the cooling medium flows. As a result, a pressure in the low-pressure portion increases, and the cooling medium flows are separated easily from the wall surface. Because of this, a film efficiency indicating a cooling efficiency on the wall surface decreases. The film efficiency is an indicator expressed as $\eta_{f,ad}=(Tg-Tf)/(Tg-Tc)$. In this formula, Tg is a temperature of gas, Tf is a surface temperature of the wall surface, and Tc is a temperature of the cooling medium on the wall surface.

Accordingly, an object of the present invention is to provide a film cooling structure which is capable of suppressing a cooling medium film from being separated from a wall surface such as a rotor blade or a stator vane in a gas turbine, to increase a film efficiency on the wall surface, thereby being capable of cooling the wall surface efficiently.

Solution to Problem

To achieve the above object, a double-jet type film cooling structure of the present invention comprises one or more pairs of injection holes which are provided on a wall surface facing a high-temperature gas passage and inject a cooling medium to the passage; a single supply passage provided inside a wall to supply the cooling medium to each pair of injection holes; and a separating section provided between the injection holes forming each pair in a location forward relative to rear ends of the injection holes to separate the cooling medium supplied from the supply passage into components flowing to the injection holes forming each pair, respectively; wherein an injection direction of the cooling medium is set to be inclined with respect to a flow direction of the high-temperature gas so that the components of the cooling medium injected from the injection holes forming each pair form swirl flows oriented in directions to push the components of the cooling medium against the wall surface.

In accordance with this configuration, the cooling medium which has passed through the single supply passage is separated by the separating section into the components flowing to the pair of injection holes, respectively. Since the separating section is positioned forward relative to the rear ends of the injection holes, the separated components of the cooling medium are restricted by the rear portions of the injection holes and form a pair of straight flows having high directivities. A low-pressure portion having a sufficiently low pressure is generated between the pair of straight flows having high directivities. Therefore, the swirl flows formed by the straight flows cause formation of forceful flows inwardly swirled from areas surrounding the straight flows to the low-pressure portion and oriented toward the wall surface. Because of this, the cooling medium is suppressed from being separated from the wall surface and a film efficiency on the wall surface is increased, which makes it possible to cool the wall surface effectively.

The separating section is preferably inclined in a rearward direction around an axis orthogonal to a direction in which the cooling medium colliding against the separating section travels, with respect to a virtual orthogonal plane orthogonal to the direction in which the cooling medium travels. In accordance with this configuration, the cooling medium colliding against the separating section is separated evenly into the components along the directions of the injection holes. Since the separating section has no inclined side surface, portions of the separated pair of components of the cooling medium are suppressed from flowing to a center portion along the direction in which the cooling medium travels, and the components of the cooling medium are separated from each other sufficiently. As a result, the low-pressure portion is formed surely between the straight flows of the cooling medium, and the swirl flows push the cooling medium flows forcefully against the wall surface.

Preferably, horizontal injection angles formed between the injection directions of the components of the cooling medium injected from the injection holes forming each pair, the injection directions being along the wall surface, and the flow direction of the high-temperature gas, are set to angles of θ1 which are oriented in opposite directions with respect to the flow direction of the high-temperature gas. This makes it possible to effectively form the film flow of the cooling medium on the wall surface along the flow direction of the high-temperature gas. As a result, the film efficiency is further increased.

Preferably, each of the horizontal injection angles θ1 is preferably in a range of 5 to 85 degrees. Preferably, a vertical injection angle θ2 which is formed between the wall surface and the injection direction of the component of the cooling medium injected from each of the injection holes to the high-temperature gas passage is in a range of 5 to 85 degrees. Preferably, the injection holes forming each pair in an opening facing the wall surface, except for the separating section, have substantially oval shapes having long axes along the injection directions, respectively; and a distance between centers of the oval shapes is set to 0 to 2 D when a hole diameter of the supply passage is D. Preferably, a length L1 of the supply passage is set to 0 to 10 D when a hole diameter of the supply passage is D. Preferably, a distance L2 from an exit of the supply passage to the opening of the pair of injection holes, the opening facing the wall surface, is set to 0.5 D to 6 D when a hole diameter of the supply passage is D. In accordance with these preferable configurations, forceful swirl flows oriented toward the wall surface are formed, which makes it possible to cool the wall surface more effectively.

Advantageous Effects of the Invention

In accordance with the present invention, a favorable film flow can be formed on a wall surface exposed to high-temperature gas while suppressing a cooling medium from being separated from the wall surface, and thus, efficient cooling of the wall surface can be carried out.

DESCRIPTION OF EMBODIMENTS

Hereinafter, a preferred embodiment of the present invention will be described with reference to the drawings.

Figure 1:
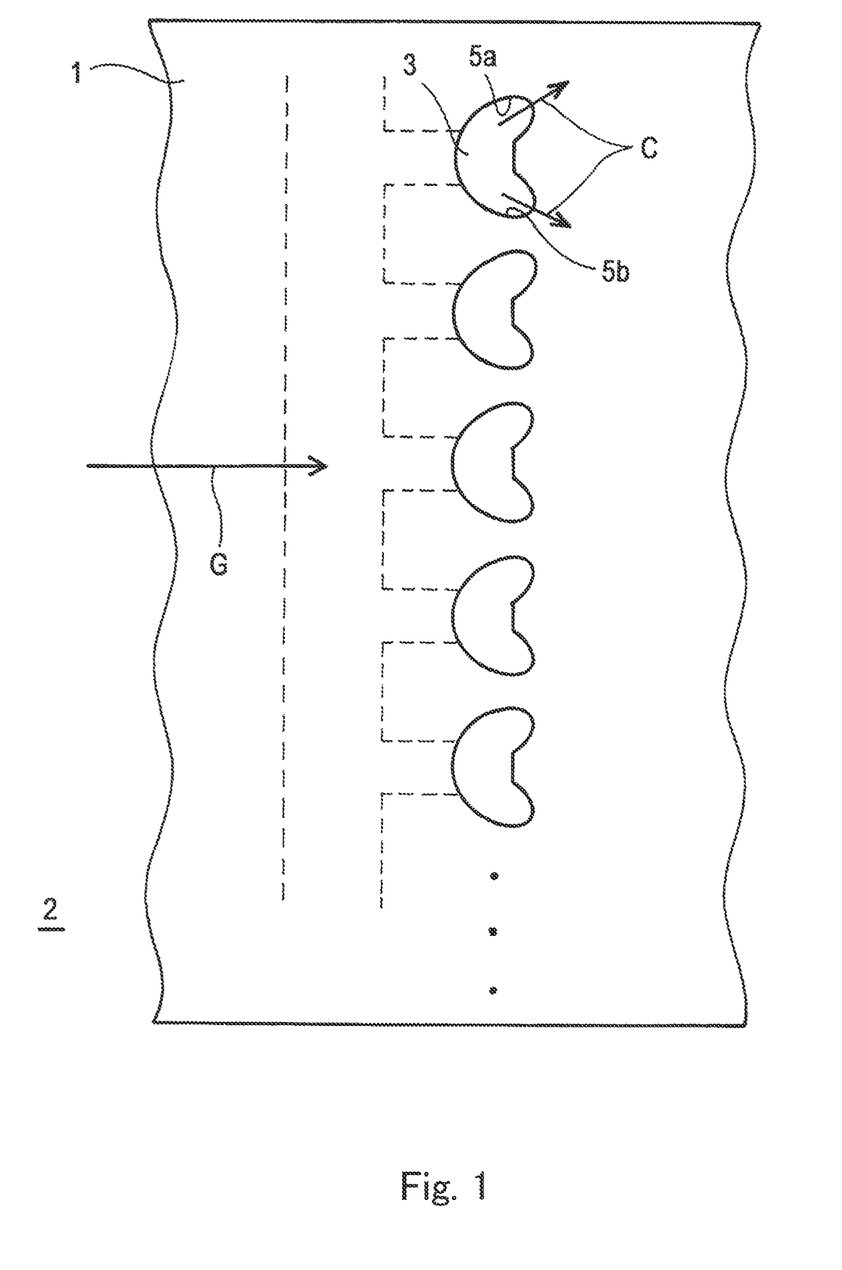
FIG. 1 is a plan view showing a portion of a wall surface exposed to high-temperature gas which uses a film cooling structure according to an embodiment of the present invention.

FIG. 1 is a plan view showing a wall surface 1 which uses a double-jet type film cooling structure according to an embodiment of the present invention. The wall surface 1 is exposed to high-temperature gas G flowing in an arrow direction. On the wall surface 1, a plurality of injection openings 3 through which a cooling medium such as air is injected to a passage 2 of the high-temperature gas G are aligned in a direction (upward and downward direction in FIG. 1) which is substantially orthogonal to the flow direction of the high-temperature gas G. Hereinafter, an upstream side along the flow direction of the high-temperature gas G will be referred to as a front side and a downstream side along the flow direction of the high-temperature gas G will be referred to as a rear side.

Each of the injection openings 3 includes a pair of first and second injection holes 5a, 5b arranged in the upward and downward direction. Each pair of the injection holes 5a, 5b are circular holes formed on the wall surface 1 from an oblique direction by a drill or the like. The injection holes 5a, 5b forming each pair are opened in an oval shape on the wall surface 1, as will be described in detail later. As shown in an enlarged front view of FIG. 2, the injection holes 5a, 5b forming each pair are formed such that injection directions A, B of a cooling medium C injected from the injection holes 5a, 5b are oriented in different directions (having different directivities) on a plane along the wall surface 1, i.e., in a plan view when viewed from the direction orthogonal to the wall surface 1. As a result, the components of the cooling medium C are injected in directions apart from each other.

Inside a wall of the wall surface 1, a single supply passage 7 is formed to supply the cooling medium C to the injection holes 5a, 5b forming each pair. The supply passage 7 has a circular cross-section, and extends from the injection opening 3 such that it is inclined in a forward direction (toward an upstream side), inside the wall of the wall surface 1. Two branch passages 71, 72 each having a circular cross-section branch from the rear end of the supply passage 7, and openings of the branch passages 71, 72 on the wall surface 1 are the injection holes 5a, 5b, respectively. The injection holes 5a, 5b forming each pair are symmetric with respect to a virtual flat plane IP passing through between the injection holes 5a, 5b, being parallel to a direction in which the high-temperature gas G travels and being orthogonal to the wall surface 1.

Figure 2:
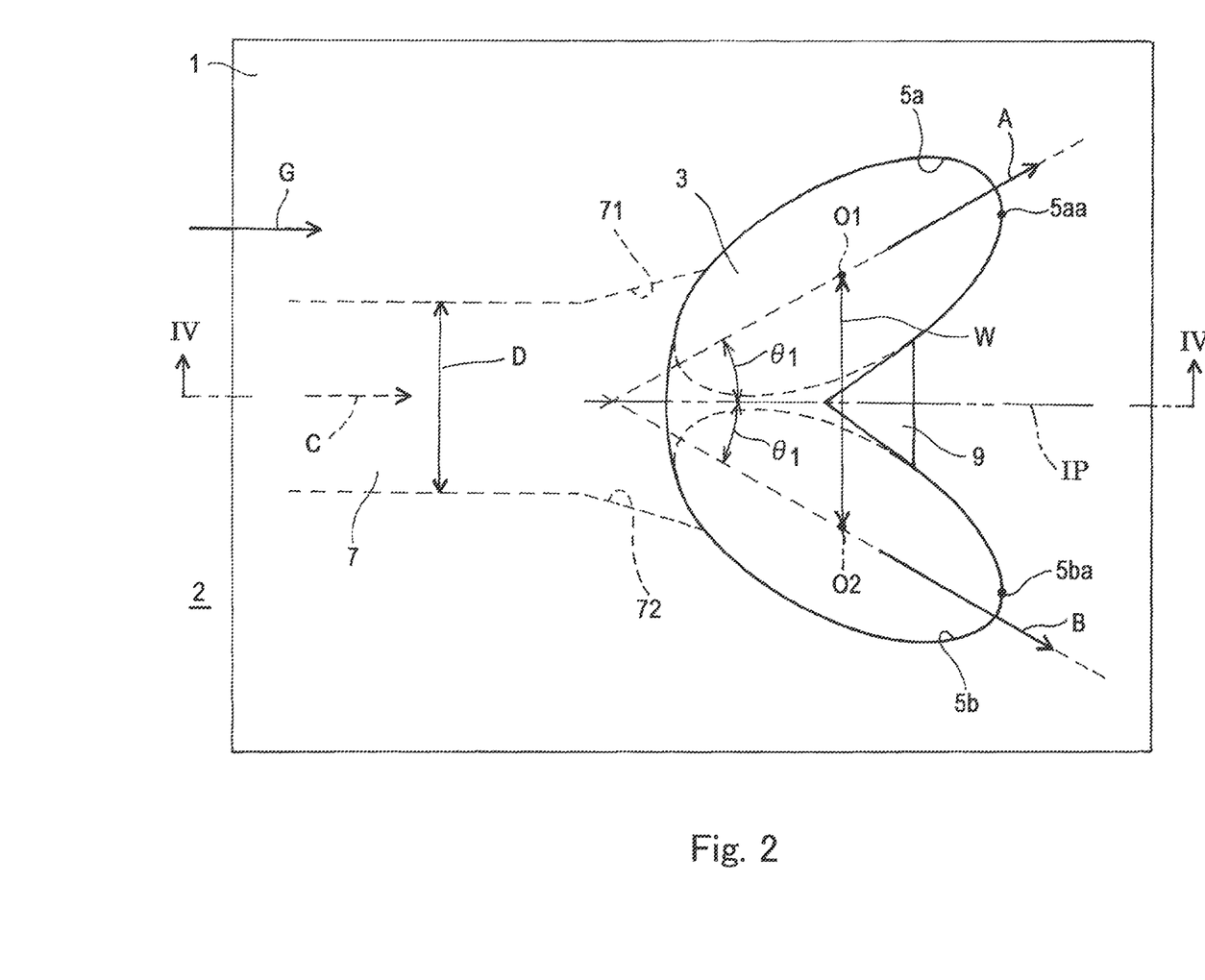
FIG. 2 is a plan view showing in an enlarged view the wall surface on which each pair of injection holes are formed.
Figure 3:
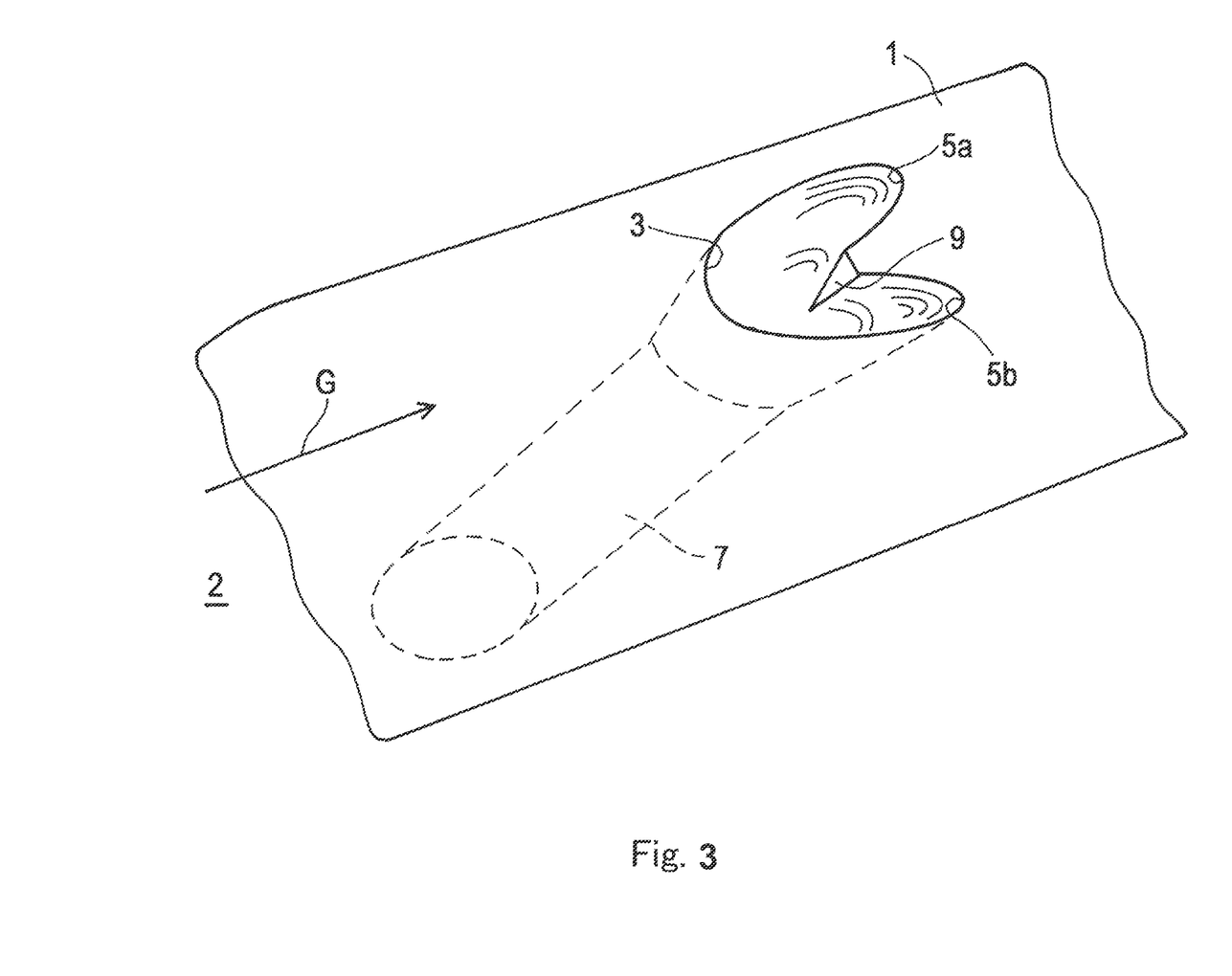
FIG. 3 is a perspective view showing a schematic configuration of the cooling structure of FIG. 1.
Figure 4:
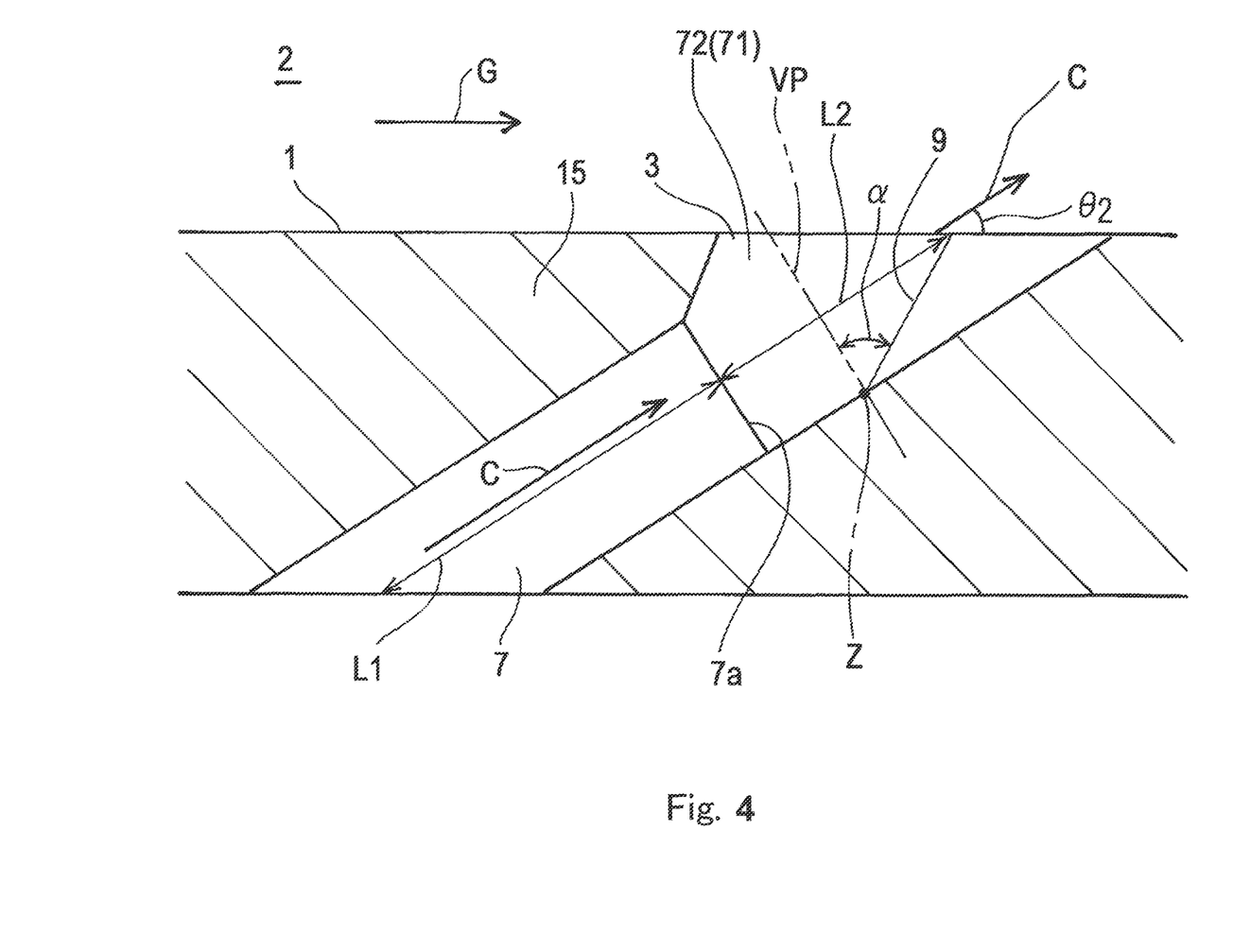
FIG. 4 is a cross-sectional view taken along IV-IV of FIG. 2.

As can be clearly seen from FIG. 3, which is a perspective view, between the injection holes 5a, 5b forming each pair, a separating section 9 is provided in a location forward relative to a rear end 5aa of the injection hole 5a and a rear end 5ba of the injection hole 5b. As shown in FIG. 2, the supply passage 7 is a straight passage, and its passage center line is positioned on the virtual flat plane IP. As shown in FIG. 4 which is the cross-sectional view taken along IV-IV of FIG. 2, the separating section 9 is positioned on the direction in which the cooling medium C supplied from the supply passage 7 travels, and is formed as a flat wall surface against which a part of the cooling medium C collides and which has no bent portion. To be more specific, the separating section 9 is inclined with an inclination angle α in a rearward direction around an axis Z orthogonal to the direction in which the cooling medium C from the supply passage 7 travels, with respect to a virtual orthogonal plane VP orthogonal to the direction in which the cooling medium C travels.

The components of the cooling medium C which are injected from the injection holes 5a, 5b, shown in FIGS. 2 to 4, act synergistically, and each of them acts to push the other against the wall surface 1. This action will be described with reference to FIGS. 5 and 6. As shown in FIG. 4, in a plan view when viewed from the direction orthogonal to the wall surface 1, the cooling medium C passes through the supply passage 7, and then its components C1, C2 flowing in regions closer to both peripheral portions flow into the injection holes 5*a*, 5*b* separated by the separating section 9 and are injected to the high-temperature passage 2 as straight cooling medium flows F1, F2 oriented in directions in which the injection holes 5*a*, 5*b* extend, respectively. In particular, since the rear end 5*aa* of the injection hole 5*a* and the rear end 5*ba* of the injection hole 5*b* are positioned rearward relative to the separating section 9, the straight cooling medium flows F1, F2 injected from portions of the injections holes 5*a*, 5*b* which are located rearward relative to the separating section 9 are formed as flows having high directivities.

Figure 5:
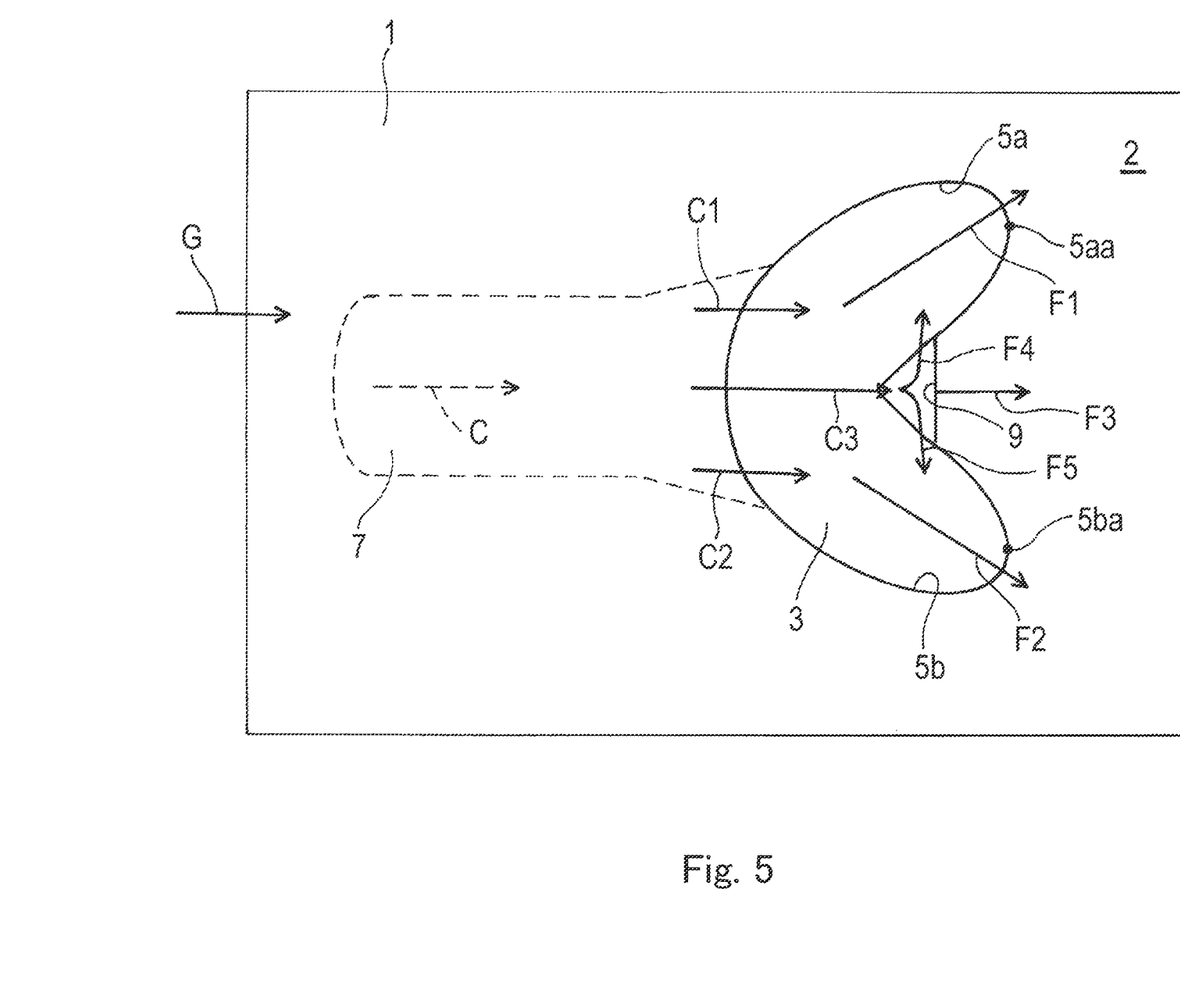
FIG. 5 is a plan view showing the action of a separating section provided in the cooling structure of FIG. 1.

In contrast, a component C3 flowing in a center portion, of the cooling medium C which has passed through the supply passage 7, collides against the separating section 9. A large part of the center component C3 which has collided against the separating section 9, flows along the separating section 9 formed as the flat surface inclined in the rearward direction as described above, and becomes a separated flow F3 along the flow direction of the center component C3, i.e., along the flow direction of the high-temperature gas G. Thereafter, the separated flow F3 flows out from the separating section 9. The separated flow F3 flows between the straight cooling medium flows F1, F2 and serves to separate the straight cooling medium flows F1, F2 from each other. A part of the center component C3 becomes mixed flows F4, F5 flowing toward the injection holes 5*a*, 5*b*, respectively. The mixed flow F4 is joined to the straight cooling medium flow F1, while the mixed flow F5 is joined to the straight cooling medium flow F2.

Figure 6:
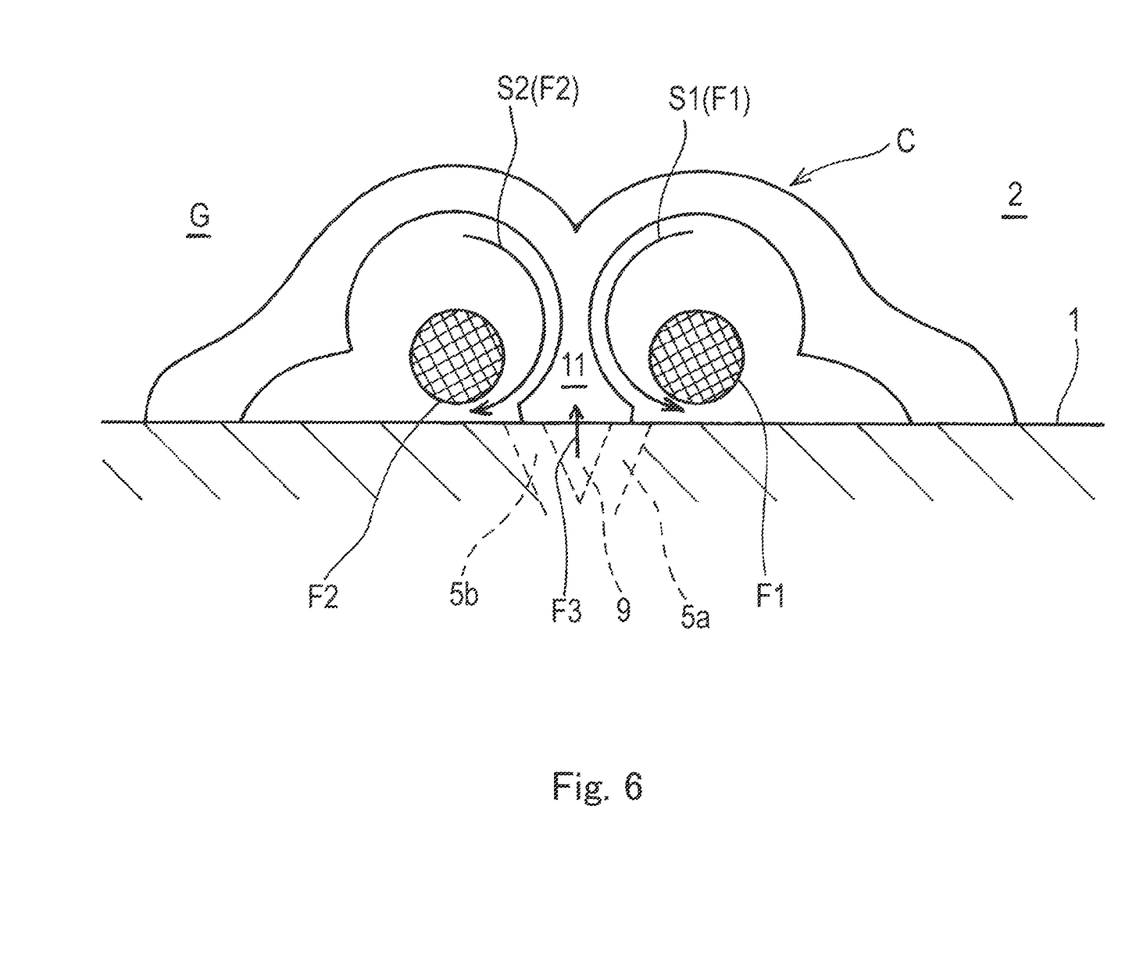
FIG. 6 is a view showing cooling medium flows formed on the outer surface of the wall surface.

FIG. 6 shows the cross-section of the high-temperature gas passage 2, which is orthogonal to the flow direction of the high-temperature gas G. The separated flow F3 from the separating section 9 allows the straight cooling medium flows F1, F2 having high directivities to be separated from each other, in the direction parallel to the wall surface 1, thereby resulting in a forceful low-pressure portion 11 between the straight cooling medium flows F1, F2. This generates flows oriented toward the wall surface 1 in inner portions of the straight cooling medium flows F1, F2, i.e., portions facing each other. As a result, swirl flows S1, S2 oriented in opposite directions are generated in the straight cooling medium flows F1, F2 such that the swirl flows S1, S2 inwardly swirl the cooling medium C toward the wall surface 1, in a portion between the straight cooling medium flows F1, F2. The swirl flows S1, S2 act to push the straight cooling medium flows F1, F2, respectively, against the wall surface 1.

By generating the low-pressure portion 11 effectively, the swirl flows S1, S2 are formed to push the cooling medium C, against the wall surface 1. For this purpose, it is necessary to position the two injections holes 5*a*, 5*b* apart from each other with a proper distance. As shown in FIG. 2, the injections holes 5*a*, 5*b* forming each pair in the injection openings 3 facing the wall surface 1, except for the separating section 9, have substantially oval shapes, having long axes along the injection directions A, B, respectively. The injections holes 5*a*, 5*b* are disposed such that a distance W between a center O1 of the oval shape of the injection hole 5*a* and a center O2 of the oval shape of the injection hole 5*b* is preferably in a range of 0 D~2 D, more preferably in a range of 0.5 D~1.5 D, when a hole diameter of the supply passage 7 is D. Note that the distance W between the center O1 and the center O2 may be 0 D (i.e., the center O1 and the center O2 conform to each other). In this case, the injection opening 3 has a shape in which the oval shapes of the injection holes 5*a*, 5*b* partially overlap with each other. In the present embodiment, the distance W between the center O1 and the center O2 is set to 1.3 D.

A horizontal injection angle θ1 formed between a component in the injection direction of the cooling medium C injected from each of the injection holes 5*a*, 5*b* forming each pair to the high-temperature gas passage 2, which component is parallel to the wall surface 1, i.e., the long axis of the oval shape of each of the injection holes 5*a*, 5*b*, when viewed from the direction orthogonal to the wall surface 1, and the flow direction of the high-temperature gas G is, preferably, in a range of 5 to 85 degrees, more preferably in a range of 25 to 35 degrees. In the present embodiment, the horizontal injection angle θ1 is set to about 30 degrees. In contrast, as shown in FIG. 3, a vertical injection angle θ2 formed between the wall surface 1 and the injection direction of the cooling medium C injected from each of the injection holes 5*a*, 5*b* forming each pair to the high-temperature gas passage 2 is, preferably, in a range of 5 to 85 degrees, more preferably in a range of 20 to 40 degrees. In the present embodiment, the vertical injection angle θ2 is set to about 30 degrees.

A ratio between a length L1 of the supply passage 7 inside of the wall surface 1, i.e., in a portion of the wall 15 forming the wall surface 1, and a distance L2 from an exit 7*a* (boundary between the supply passage 7 and the branch passage 71, 72) of the supply passage 7 to the injection opening 3 is, preferably L1:L2=3~5:2~4, and more preferably L1:L2=3.5~4.5:2.5~3.5. In the present embodiment, L1:L2=3:2. The supply passage length L1 is preferably in a range of 0 D~10 D, more preferably in a range of 1 D~5 D, in the relation with a hole diameter of D of the supply passage 7. The fact that the supply passage length L1 is 0 D means that the supply passage 7 exists but its length L1 is very small. In contrast, the distance L2 between the supply passage and the injection opening is preferably in a range of 0.5 D~6 D, more preferably in a range of 1 D~4 D. If the length L1 and the distance L2 fall outside the above ranges, the straight cooling medium flows F1, F2 will not flow straight in a sufficient level, which will not result in the swirl flows S1, S2 having a desired force. The supply passage length L1 is the length along the center axis of the supply passage 7, and the distance L2 between the supply passage and the injection opening is the distance along the center axis of the supply passage 7. In the present embodiment, the supply passage length L1 is set to 3 D, and the distance L2 between the supply passage and the injection opening is set to 2 D. According to an experiment, when the supply passage length L1 was set to 3 D, and the distance L2 between the supply passage and the injection opening was set to 2 D, a film efficiency became twice to three times higher than that of the conventional structure.

The inclination angle α of the separating section 9 with respect to the virtual orthogonal plane VP is preferably in a range of 30 to 85 degrees and more preferably in a range of 60 to 80 degrees. In the present embodiment, the inclination angle α is set to 70 degrees. By forming the separating section 9 as a flat surface and setting the inclination angle α to the above stated value, the separated flow F3 flows out from the separating section 9 with a proper amount, and the straight cooling medium flows F1, F2 are separated from each other effectively. This allows the low-pressure portion to be formed surely between the straight cooling medium flows F1, F2 of FIG. 5, and the swirl flows S1, S2 to push the flow of the cooling medium C against the wall surface 1 more forcefully. Note that the separating section 9 may be formed by a curved surface which is recessed in a slightly rearward direction instead of the flat surface.

Figure 7:
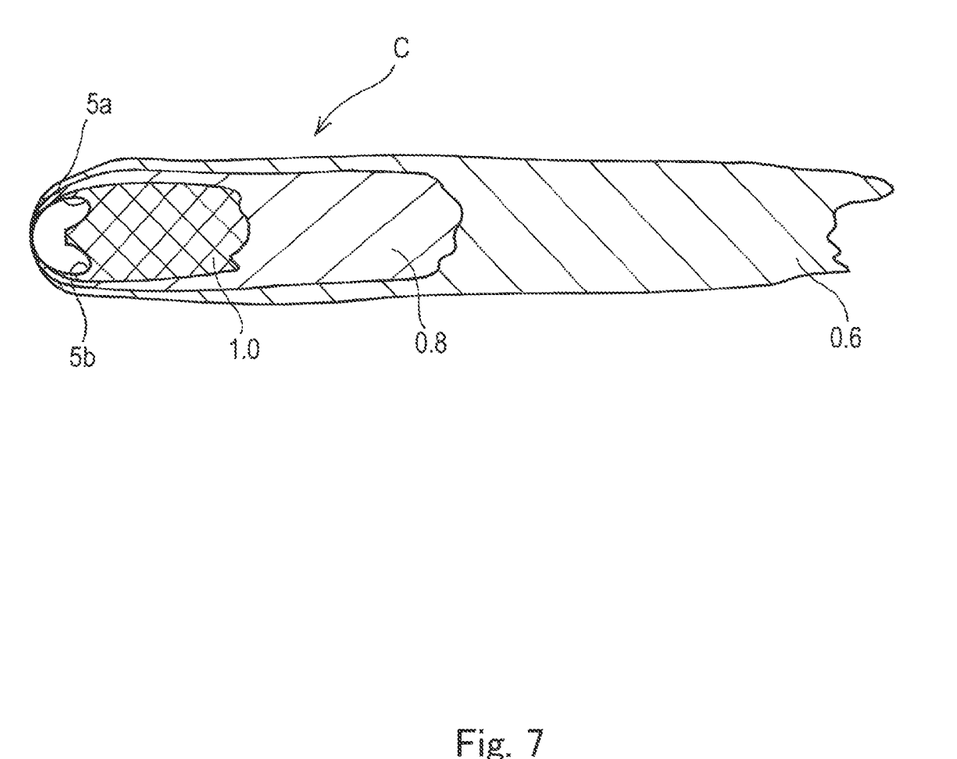
FIG. 7 is an isogram diagram of a film efficiency obtained in the wall surface.

In accordance with the above described cooling structure, as shown in FIG. 6, the components of the cooling medium C injected from the injection holes 5a, 5b forming each pair are pushed against the wall surface 1 by the swirl flows S1, S2 inwardly swirled to the low-pressure portion 11, and contact a wide range of the wall surface 1, thereby forming a film flow of the cooling medium C. In this way, the cooling medium C is suppressed from being separated from the wall surface 1, and the film efficiency on the wall surface 1 is increased, which makes it possible to cool the wall surface 1 effectively. FIG. 7 is an isogram diagram of the film efficiency $\eta_{f,ad}$ obtained on the wall surface 1 by forming the injection holes 5a, 5b of FIG. 2. As can be clearly seen from FIG. 7, the cooling medium C injected from each of the injection holes 5a, 5b forms a region of a film efficiency of 1.0 in its downstream region, a region of a film efficiency of 0.8 which surrounds the region of a film efficiency of 1.0, and a region of a film efficiency of 0.6 which surrounds the region of a film efficiency of 0.8, each of the regions having a progressively wider range. By forming the film flow of the cooling medium C with such a very high film efficiency on the wall surface 1, the cooling medium C is prevented from being separated from the wall surface 1, and thus efficient cooling of the wall surface 1 is carried out.

[Examples]

Figure 8:
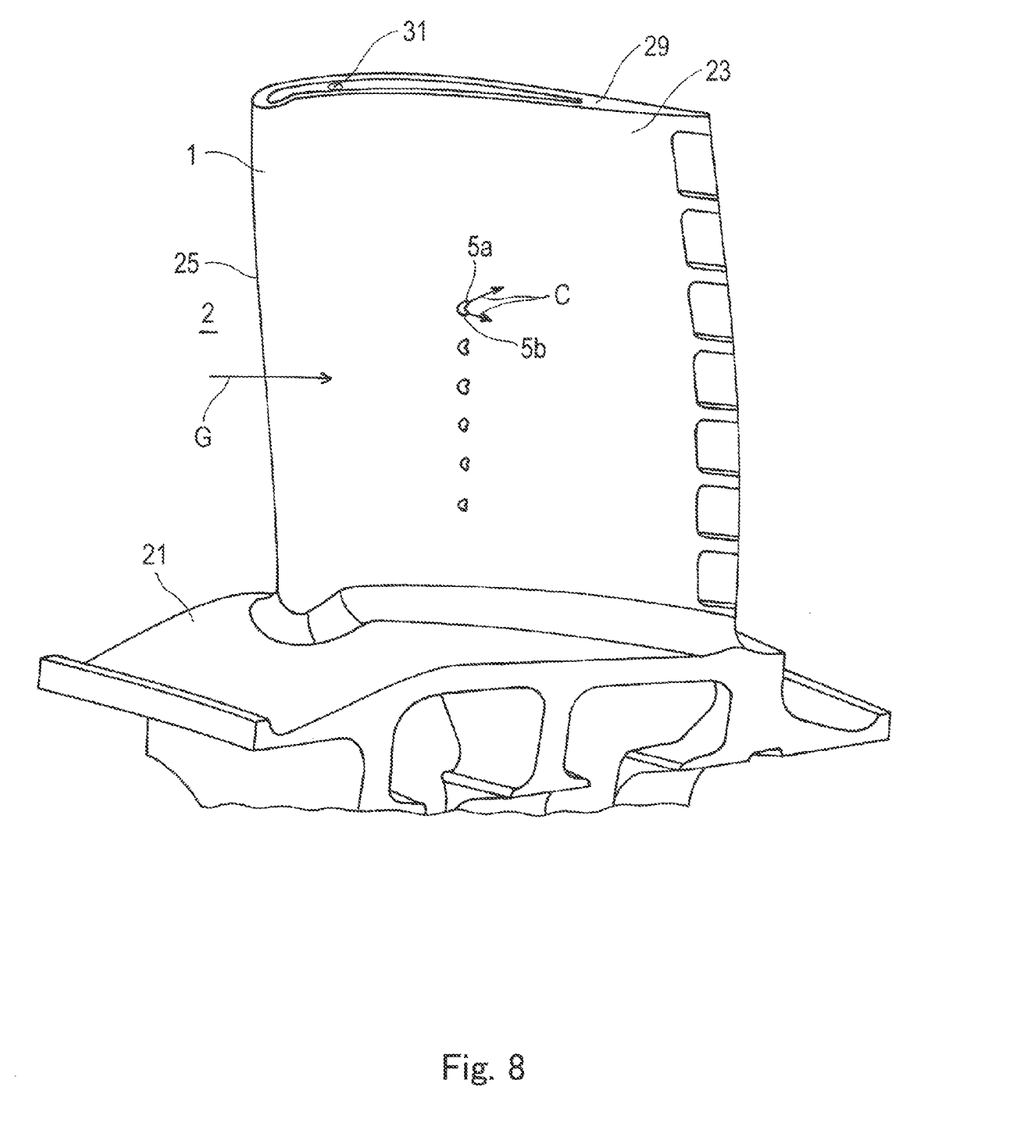
FIG. 8 is a perspective view of a turbine rotor blade showing an example of the present invention.
Figure 9:
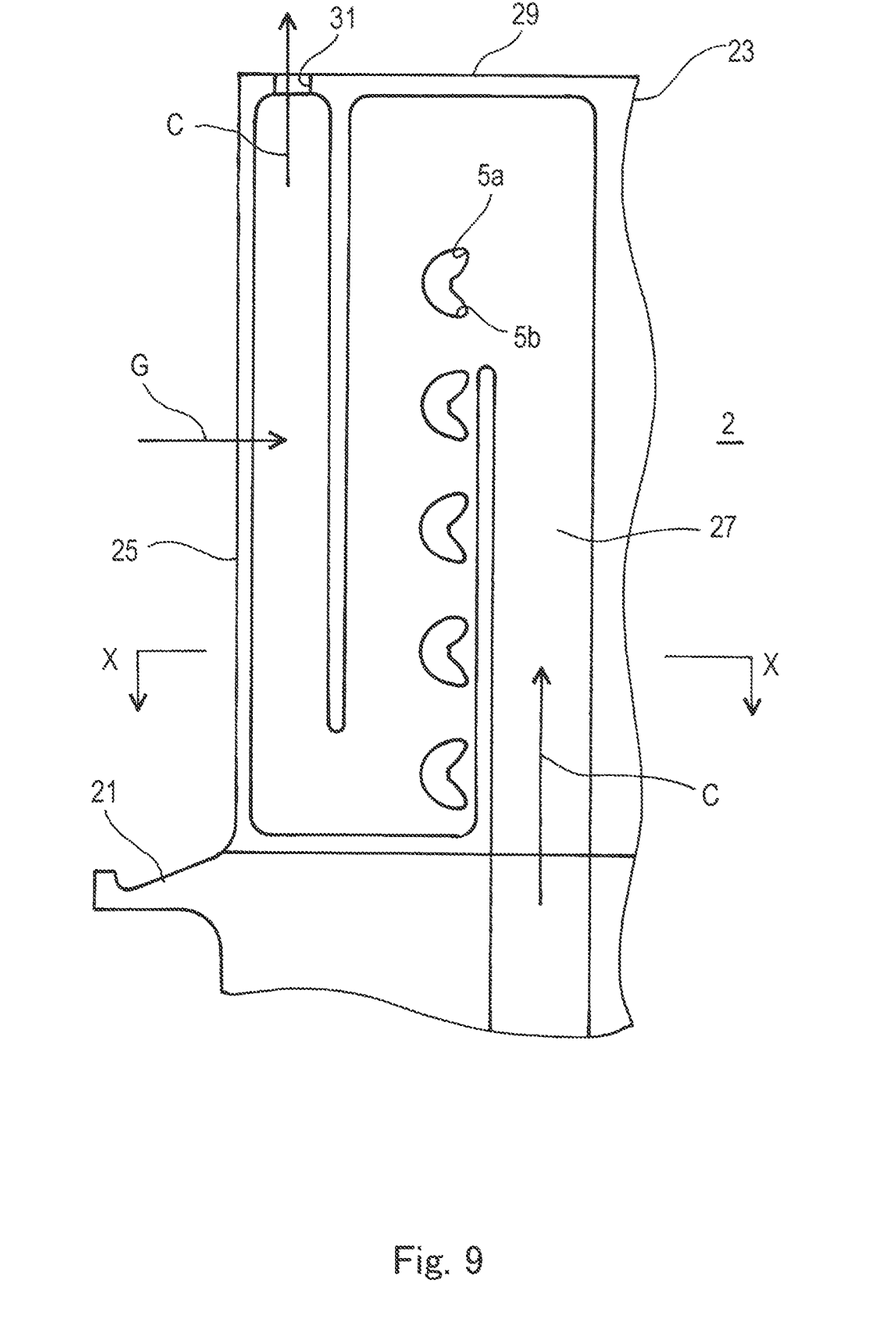
FIG. 9 is a longitudinal sectional view of the turbine rotor blade.
Figure 10:
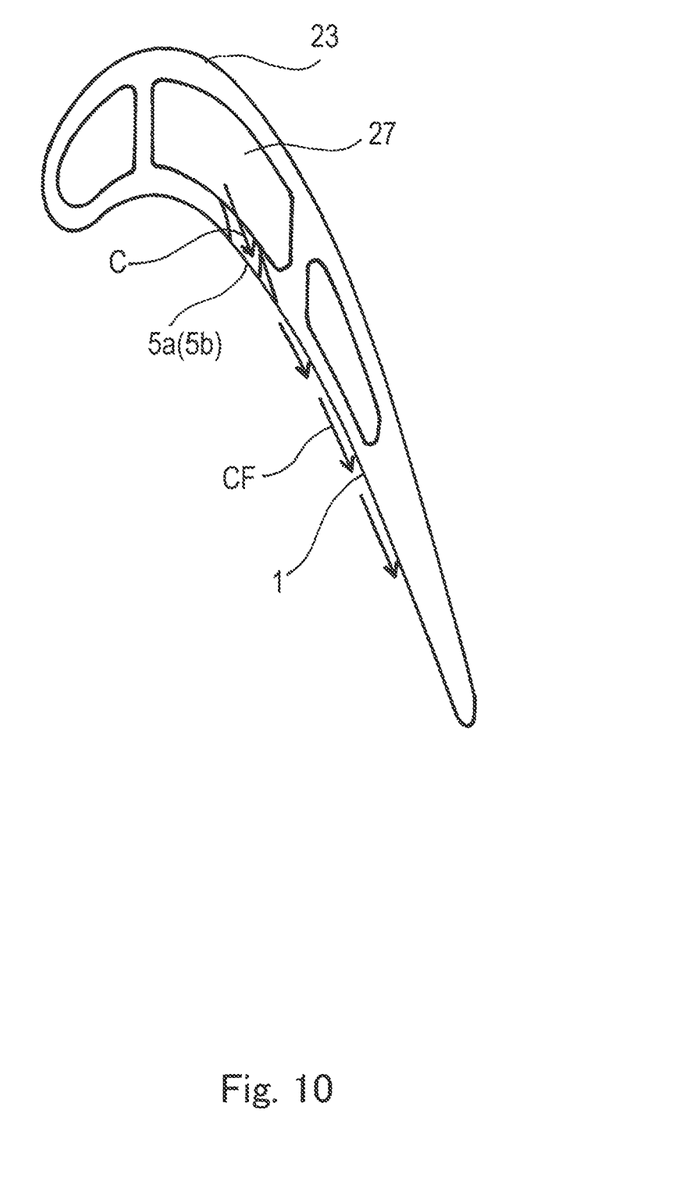
FIG. 10 is a cross-sectional view taken along X-X of FIG. 9.

FIGS. 8 to 10 show examples in which the present invention is applied to a turbine blade of a gas turbine. The gas turbine includes a compressor for compressing air, a combustor which is supplied with a fuel and the compressed air supplied from the compressor and combusts the fuel, and a turbine actuated by high-temperature and high-pressure combustion gas from the combustor. The turbine is configured in such a manner that many rotor blades 23 are implanted in the outer peripheral portion of a turbine disc 21 of FIG. 9. In a portion of the blade surface (wall surface 1) of the rotor blade 23 of FIG. 8, which is located slightly rearward relative to a front edge 25, six pairs of injection holes 5a, 5b are aligned in a radial direction, and face a high-temperature gas (combustion gas) passage 2 between adjacent rotor blades 23.

Inside of the rotor blade 23, a cooling medium passage 27 having a folded shape as shown in FIG. 9 is formed. The injection holes 5a, 5b communicate with an intermediate portion of the cooling medium passage 27. The cooling medium C which has been extracted from the compressor and comprise air, is introduced into the cooling medium passage 27 through a passage inside of the turbine disc 21 and injected from the injection holes 5a, 5b. After that, the cooling medium C is injected into the passage 2 through an injection hole 31 which is opened in a blade tip 29. In this way, the cooling medium C injected from the injection holes 5a, 5b which are opened in the blade surface of FIG. 10, which is the wall surface 1, forms a film flow CF of the cooling medium C on the blade surface 1, which cools the rotor blade 23 effectively.

While in the above examples, plural pairs of injection holes 5a, 5b are aligned at equal intervals in the upward and downward direction, the number and arrangement of the plural pairs of injection holes 5a, 5b may be suitably selected. For example, there may be provided two lines each of which is formed by the plural pairs of injection holes 5a, 5b aligned at equal intervals in the radial direction such that these lines are spaced apart from each other in a forward and rearward direction and the radial positions of the injection holes 5a, 5b forming each pair in the front line are deviated from the radial positions of the injection holes 5a, 5b forming each pair in the rear line.

The present invention is widely applicable to the wall surface facing the high-temperature gas passage such as a stator vane, and an inner tube of a combustor, as well as the rotor blade of the gas turbine.

Although the preferred embodiment of the present invention has been described above with reference to the drawings, various additions, changes and deletions may be made within the spirit of the present invention. Therefore, such additions, changes and deletions may be included in the scope of the present invention.

INDUSTRIAL APPLICABILITY

The present invention is useful in suppressing a cooling medium from being separated from a wall surface and effectively cooling the wall surface, in a film cooling structure in which injection holes are provided on the wall surface facing a high-temperature gas passage such as a rotor blade, a stator vane and an inner tube of a combustor in a gas turbine engine, and cooling of the wall surface is performed by flowing a cooling medium injected from the injection holes along the wall surface. Further, the present invention is widely applicable to the wall surface facing the high-temperature gas passage such as the stator vane, and the inner tube of the combustor, as well as the rotor blade of the gas turbine.

REFERENCE CHARACTERS LIST 1 wall surface
2 high-temperature gas passage
5a, 5b pair of injection holes
7 supply passage
9 separating section
A, B injection direction of cooling medium
S1, S2 swirl flows
C cooling medium
D hole diameter of supply passage
G high-temperature gas
θ1 horizontal injection angle
θ2 vertical injection angle

The invention claimed is:

1. A double-jet type film cooling structure comprising:
one or more pairs of injection holes which are provided on a wall surface facing a high-temperature gas passage and inject a cooling medium to the passage;
a single supply passage provided inside a wall to supply the cooling medium to each pair of injection holes; and
a separating section provided between the injection holes forming each pair in a location forward relative to rear ends of the injection holes to separate the cooling medium supplied from the supply passage into components flowing to the injection holes forming each pair, respectively;
wherein an injection direction of the cooling medium is set to be inclined with respect to a flow direction of a high-temperature gas so that the components of the cooling medium injected from the injection holes forming each pair form swirl flows oriented in directions to push the components of the cooling medium against the wall surface;

the separating section is positioned with an inclination angle that is formed relative to a virtual plane that is orthogonal to a direction in which the cooling medium travels in the supply passage and on a rearward side of the virtual plane relative to the direction in which the cooling medium travels, such that a surface of the separating section approaches a center axis of the supply passage in the direction in which the cooling medium travels, and is formed as a flat surface against which a part of the cooling medium collides and which has no bent portion, the separating section extending from a passage of the cooling medium formed inside of the wall to the wall surface; and the injection holes forming each pair are circular holes opened on the wall surface from an oblique direction and are opened in a substantially oval shape on the wall surface.

2. The double-jet type film cooling structure according to claim 1,
wherein the inclination angle is in a range of 30 to 85 degrees.

3. The double-jet type film cooling structure according to claim 1,
wherein horizontal injection angles formed between injection directions of the components of the cooling medium injected from the injection holes forming each pair, the injection directions being along the wall surface, and the flow direction of the high-temperature gas, are set to angles of $\theta 1$ which are oriented in opposite directions with respect to the flow direction of the high-temperature gas.

4. The double-jet type film cooling structure according to claim 3,
wherein each of the horizontal injection angles $\theta 1$ is in a range of 5 to 85 degrees.

5. The double-jet type film cooling structure according to claim 1,
wherein a vertical injection angle $\theta 2$ which is formed between the wall surface and the injection direction of the component of the cooling medium injected from each of the injection holes to the high-temperature gas passage is in a range of 5 to 85 degrees.

6. The double-jet type film cooling structure according to claim 1,
wherein the injection holes forming each pair in an opening facing the wall surface, except for the separating section, have substantially oval shapes having long axes along the injection directions, respectively; and a distance between centers of the oval shapes is set to 0 to 2 D when a hole diameter of the supply passage is D.

7. The double-jet type film cooling structure according to claim 1,
wherein a length L1 of the supply passage is set to 0 to 10 D when a hole diameter of the supply passage is D.

8. The double-jet type film cooling structure according to claim 1,
wherein a distance L2 from an exit of the supply passage to the opening of the pair of injection holes, the opening facing the wall surface, is set to 0.5 D to 6 D when a hole diameter of the supply passage is D.

* * * * *